United States Patent Office 2,984,636
Patented May 16, 1961

2,984,636

REACTING AROMATIC DIISOCYANATE AND ETHYLENE GLYCOL IN DIMETHYLSULFOXIDE, SOLUTIONS OBTAINED THEREFROM, AND FILAMENT

Donald J. Lyman, Wilmington, Del., assignor to E. I. du Pont de Nemours and Company, Wilmington, Del., a corporation of Delaware No Drawing. Filed May 8, 1957, Ser. No. 657,716

14 Claims. (Cl. 260—30.8)

This invention relates to a process for the preparation of high molecular weight polymers and more specifically to a process whereby polyurethanes can be obtained directly in desirable forms.

Polyurethanes are a class of synthetic polymers, well known in the art, which offer a useful combination of physical and chemical properties. Some have been used to form synthetic fibers which have reached commercial acceptance. Preparation of high molecular weight polyurethanes is described in U.S. Patent 2,284,637, issued July 2, 1942, to W. E. Catlin, and in U.S. Patent 2,511,544, issued June 13, 1950, to Rinke et al. Specifically the polymers of these patents are prepared by the interaction of diisocyanates with dihydroxy compounds. Other reactions are also suitable for the preparation of polyurethanes. For example, diamines can be reacted with bischlorocarbonic esters of organic glycols to give high molecular weight polymers.

While both of these methods of preparing polyurethanes have advantages, the diamine reaction has in general been preferred because it has been found to be applicable to a wider range of reactants. One disadvantage of the diamine-based reaction is that during the course of the polymerization there is produced as a byproduct a hydrogen halide which must be continually removed from the zone of reaction if a high molecular weight polymer is to be obtained. This is normally done through the use of basic acid acceptors, and leads to the formation of a metallic or organic halide salt. Such halide salts can be removed from the reaction product by filtration or most frequently by precipitating the polymer, thoroughly washing and subsequently redissolving.

The diisocyanate-glycol reaction does not involve the formation of such a by-product salt and would, therefore, be more desirable. Reactions for producing suitable polyurethanes have been successful when the more reactive diphenols have been used, and even with certain of the aliphatic glycols, such as 1,4-butane diol. However, in the past it has not been found possible to apply this reaction to the formation of high molecular weight polyurethanes from ethylene glycol. One reason for this may be that ethylene glycol is only moderately reactive while diisocyanates are highly reactive and tend to combine with any ordinary solvent which is suitable for a reaction medium. It would be desirable if polyurethanes could be prepared from ethylene glycol in a non-reactive solvent medium for then the polymer would be obtained in a pure form without contamination by by-product salts.

Even more desirable would be a process which would involve a solvent for the resulting polymer as a reaction medium. This would result in a reaction product which was a solution of the polymer ready for further processing. However, polyurethanes are notoriously insoluble in non-reactive materials and any solvents for the polymer which have been employed heretofore as reaction media have proved to be so reactive with the diisocyanate that the slow-reacting ethylene glycol could not be used to obtain a high molecular weight polyurethane.

The article, "Synthetic Fiber Developments in Germany," a compilation of reports by the Technical Industrial Intelligence Committee, edited by L. H. Smith, and published by the Textile Research Institute in 1946, discusses the reactions of diisocyanates and glycols, indicating that ethylene glycol has consistently failed to give useful polymers. Example 1 of U.S. 2,511,544 illustrates the type of product obtained when ethylene glycol and metaphenylene diisocyanate are reacted in ordinary organic solvents. The white, crumbly mass resulting from this reaction would have little or no commercial or practical value. Such masses are not known to have an inherent viscosity of above 0.2 in N,N-dimethylformamide at 20° C., whereas polyurethanes suitable for preparing strong, high tenacity fibers must have a high molecular weight as indicated by an inherent viscosity of at least about 0.4 in N,N-dimethylformamide at 20° C. For this reason, the formation of polyurethanes containing the —O(CH$_2$)$_2$O— group has generally been limited to reactions via the diamine-bischlorocarbonate route, and it has been accepted as a necessary inconvenience that the polymeric product must be precipitated, washed, filtered, and redissolved.

An objective of this invention is to provide a process whereby strong, high tenacity polyurethane fibers can be prepared directly from a polymeric reaction product mixture produced by reacting ethylene glycol and an aromatic diisocyanate, that is, without separation and purification of the polymeric reaction product prior to fiber formation. A further objective is a single step preparation of high molecular weight polyurethanes from ethylene glycol in the form of solutions which are suitable without further treatment for forming into fibers. Other objects will be apparent from the following disclosure.

These objectives are achieved by reacting substantially equimolar proportions of ethylene glycol and an aromatic diisocyanate having the formula:

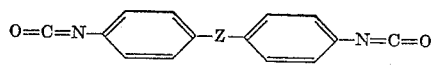

where Z is a divalent radical taken from the group consisting of —CH$_2$— and —C(CH$_3$)$_2$—, the reaction being conducted in a solvent comprising dimethylsulfoxide. Optionally, a minor proportion of another organic solvent, taken from the group consisting of a lower aliphatic halohydrocarbon or ketone, which is neutral, non-reactive with the diisocyanate, completely miscible with dimethylsulfoxide, and which has a boiling point below 150° C. may be used in conjunction with dimethylsulfoxide. The reaction produces a solution of a polyurethane which can be immediately spun by conventional dry spinning processes into strong tough fibers.

Reactions of this invention, when carried out at a temperature between 50° C. and 150° C., produce high molecular weight polymers characterized by the repeating structural units:

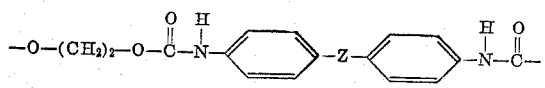

where Z is a divalent radical taken from the group consisting of —CH$_2$— and —C(CH$_3$)$_2$—. These polymers are characterized by a melting point between about 200° C. and about 250° C. and an inherent viscosity between about 0.4 and about 1.4 in N,N-dimethylformamide at 20° C. These polymers remain dissolved in the reaction medium without gel formation. By proper choice of the concentration of reactants so that the final polymer concentration is between 10 and 30% by weight, the solutions obtained are suitable, without further treatment, for spinning, film casting or other processing.

Specific embodiments of this invention are illustrated by the following examples. All parts are by weight unless otherwise indicated.

*Example I*

Bis(4-isocyanatophenyl)methane in the amount of 25.02 parts is added to a solution of 6.20 parts of ethylene glycol in 44 parts of dimethylsulfoxide and 32 parts of 4-methylpentanone-2. After heating the resulting solution for 1½ hours at 120° C., a viscous solution containing dissolved polyurethane is produced. This solution is poured directly, without further treatment, into a dry spinning cell, and spun through a 5 x 0.004 inch hole spinneret to give tough white fibers. These fibers are drawn through a steam tube to 3.3 times their original length and then tested. They have a tenacity of 3.4 grams per denier with an elongation of 32% at the break and an initial modulus of 42 grams per denier.

Inherent viscosity of polymer is 1.38 in N,N-dimethylformamide at 20° C. All values of inherent viscosity in the specification and claims are calculated from the equation:

$$\text{Inherent viscosity} = \frac{\ln R_r}{C}$$

wherein $R_r$ is the viscosity of a solution of 0.5 gram of polymer in 100 milliliters of N,N-dimethylformamide at 20° C. divided by the viscosity of N,N-dimethylformamide in the same units and at the same temperature, and C is the concentration of the polymer solution in grams of polymer per 100 milliliters of solution.

*Example II*

Bis(4-isocyanatophenyl)methane in the amount of 30.03 parts is added to 7.45 parts of ethylene glycol dissolved in 99 parts of dimethylsulfoxide. The solution was heated for 1½ hours at 150° C. to produce a solution of the polyurethane polymer, the solution having a viscosity suitable for spinning into fibers without further treatment of any sort. This solution is poured into a dry spinning cell and spun directly to give tough white fibers. After drawing to 3.7 times their original length through a steam tube, the fibers have a tenacity of 4.0 grams per denier, and elongation at the break of 48%, and an initial modulus of 38 grams per denier. Inherent viscosity of polymer is 0.57 in N,N-dimethylformamide at 20° C.

*Example III*

Bis(4-isocyanatophenyl)methane in the amount of 5.0 parts is added to a solution of 1.24 parts of ethylene glycol, 8.8 parts of dimethylsulfoxide and 6.4 parts of acetone in a glass reaction tube. The tube is then sealed and heated to 100° C. for 1½ hours. The polymer which is precipitated by the addition of water, and separated by filtration has an inherent viscosity of 0.70 in N,N-dimethylformamide at 20° C.

*Example IV*

To a solution of 3.72 parts of ethylene glycol in 27.5 parts of dimethylsulfoxide and 16 parts of 4-methyl pentanone-2 is added 16.71 parts of 2,2-bis(4-isocyanatophenyl)propane. After heating the resulting solution at 110° C. for 1¼ hours, a clear viscous solution containing dissolved polyurethane polymer is obtained. This solution is poured into a dry-spinning cell and spun directly through a 5 x 0.005 inch hole spinneret to give strong fibers. After drawing these fibers to 2½ times their original length in the presence of steam, they have a tenacity of 0.53 gram per denier and a break elongation of 16%. Inherent viscosity of the polymer is 0.59 in N,N-dimethylformamide at 20° C.

*Example V*

To a solution of 6.20 parts of ethylene glycol in 57.2 parts of dimethylsulfoxide and 51.2 parts of carbon tetrachloride is added 25.02 parts of bis(4-isocyanatophenyl)methane. The resulting solution is stirred and heated at 85° C. for one and one-half hours to produce a clear, viscous solution containing dissolved polyurethane polymer. This solution is extruded into water and the resulting heavy filaments are drawn to two times their original length in hot water to give a moderately strong fiber. Inherent viscosity of the polymer is 0.60 in N,N-dimethylformamide at 20° C.

*Example VI*

To 5.0 parts of bis(4-isocyanatophenyl)methane in a polymer tube is added a solution of 1.24 parts of ethylene glycol in 13.2 parts of dimethylsulfoxide and 10.7 parts of dichloromethane. The tube is sealed and then heated in a steam bath for two hours. Polymer is precipitated from the viscous solution by the addition of water and separated by filtration. Inherent viscosity of the polymer is 0.63 in N,N-dimethylformamide at 20° C.

*Example VII*

To a solution of 1.24 parts of ethylene glycol in 14.3 parts of dimethylsulfoxide and 11.3 parts of 1,1,2,2-tetrachloroethylene is added 5.0 parts of bis(4-isocyanatophenyl)methane. The resulting solution is heated at 110–120° C. for one and one-fourth hours to produce a clear, viscous solution containing dissolved polyurethane polymer. Filaments formed by extrusion of this solution into water are drawn two times their original length in hot water to produce moderately tough fibers. Inherent viscosity of the polymer is 1.08 in N,N-dimethylformamide at 20° C.

While the examples above show the use of dimethylsulfoxide solvent alone and with each of five different additional solvents, other low-boiling aliphatic halohydrocarbons and ketones can also be used, provided that they are non-reactive with the diisocyanate, miscible with the dimethylsulfoxide and have a boiling point below about 150° C. As illustrated in Example I, a higher molecular weight polymer is produced when the minor proportion of organic solvent comprises 4-methylpentanone-2. Though this aliphatic ketone is preferred, additional suitable aliphatic ketones include methyl ethyl ketone, methyl propyl ketone, diethyl ketone, dipropyl ketone and the like. Other suitable solvents include halohydrocarbons such as methylene bromide, chlorobromomethane, isomeric chlorobromoethanes, ethylene chloride, trichloroethane and the like.

Although the aromatic diisocyanate referred to above is preferable in this novel process, other aromatic diisocyanates can also be used, particularly those which possess structures substantially the same as those shown.

A surprising and important feature of the present invention is that with the new solvents discussed above, it is for the first time possible to obtain high molecular weight polymeric materials having an inherent viscosity between about 0.4 and about 1.4 directly from ethylene glycol in reaction with these particular organic aromatic diisocyanates. Its commercial potential can readily be comprehended when it is realized that now for the first time polyurethanes from ethylene glycol can be obtained directly in the form of solutions suitable for spinning and even in the form of fibers and filaments spun from such solutions, without at any stage in the process having to go to the trouble and expense of removing by-product salts or isolating and purifying the polymer product prior to spinning.

I claim:

1. The process of directly preparing high molecular weight polyurethane filaments comprising reacting an aromatic diisocyanate of the formula

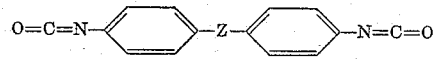

where Z is a divalent radical taken from the group consisting of —CH$_2$— and —C(CH$_3$)$_2$—, and ethylene glycol in an organic solvent medium comprising dimethylsulfoxide as a major constituent at a reaction temperature between about 50° C. and about 150° C., whereby the inherent viscosity of the resulting polymer is at least about 0.4, and without further treatment, extruding the polymer solution to form filaments.

2. The process of claim 1 wherein the inherent viscosity of the resulting polymer is between about 0.4 and about 1.4.

3. The process of directly preparing high molecular weight polyurethane filaments comprising reacting an aromatic diisocyanate of the formula

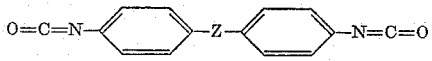

where Z is a divalent radical taken from the group consisting of —CH$_2$— and —C(CH$_3$)$_2$—, and ethylene glycol in an organic solvent medium comprising a major proportion of dimethylsulfoxide, the remaining proportion being one of the group consisting of an aliphatic chlorohydrocarbon and aliphatic bromohydrocarbon and an aliphatic ketone, which is miscible with the dimethylsulfoxide and has a boiling point of below about 150° C.

4. The process of claim 2 wherein the remaining proportion comprises carbon tetrachloride.

5. The process of claim 2 wherein the remaining proportion comprises dichloromethane.

6. The process of claim 2 wherein the remaining proportion comprises 1,1,2,2-tetrachloroethylene.

7. The process of claim 2 wherein the remaining proportion comprises 4-methylpentanone-2.

8. The process of claim 2 wherein the remaining proportion comprises acetone.

9. The process of claim 2 wherein the aromatic diisocyanate is bis(4-isocyanatophenyl)methane.

10. The process comprising reacting an aromatic diisocyanate of the formula

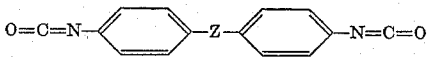

where Z is a divalent radical taken from the group consisting of —CH$_2$— and —C(CH$_3$)$_2$—, and ethylene glycol in an organic solvent medium comprising dimethylsulfoxide as a major constituent.

11. The process comprising reacting substantially equimolar proportions of an aromatic diisocyanate and ethylene glycol in an organic solvent medium comprising dimethylsulfoxide as a major constituent, said diisocyanate having the formula

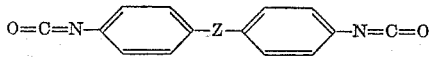

where Z is a divalent radical taken from the group consisting of —CH$_2$— and —C(CH$_3$)$_2$—.

12. The novel filament spinning composition comprising a solution of a polymer in an organic solvent medium comprising dimethylsulfoxide as a major constituent, said polymer being characterized by the repeating structural unit:

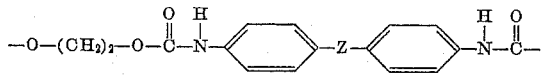

where Z is a divalent radical taken from the group consisting of —CH$_2$— and —C(CH$_3$)$_2$, and said polymer having an inherent viscosity of at least about 0.4.

13. The novel filament spinning composition comprising a solution of a polymer in an organic solvent comprising a major proportion of dimethylsulfoxide, the remaining proportion being one of the group consisting of an aliphatic chlorohydrocarbon and aliphatic bromohydrocarbon and an aliphatic ketone which is miscible with the dimethylsulfoxide and has a boiling point below about 150° C., said polymer being characterized by the repeating structural unit:

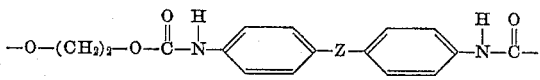

where Z is a divalent radical taken from the group consisting of —CH$_2$— and —C(CH$_3$)$_2$, and said polymer having an inherent viscosity of at least about 0.4.

14. The novel filament spinning composition of claim 13 wherein the polymer has an inherent viscosity of between about 0.4 and about 1.4.

References Cited in the file of this patent

UNITED STATES PATENTS

| | | |
|---|---|---|
| 2,284,896 | Hanford et al. | June 2, 1942 |
| 2,302,037 | Kollek | Nov. 17, 1942 |
| 2,811,497 | Ham | Oct. 29, 1957 |